April 3, 1928.  1,664,662
H. D. GEYER ET AL
ELASTIC MOTOR MOUNTING FOR VEHICLES
Filed Dec. 16, 1921  4 Sheets-Sheet 2

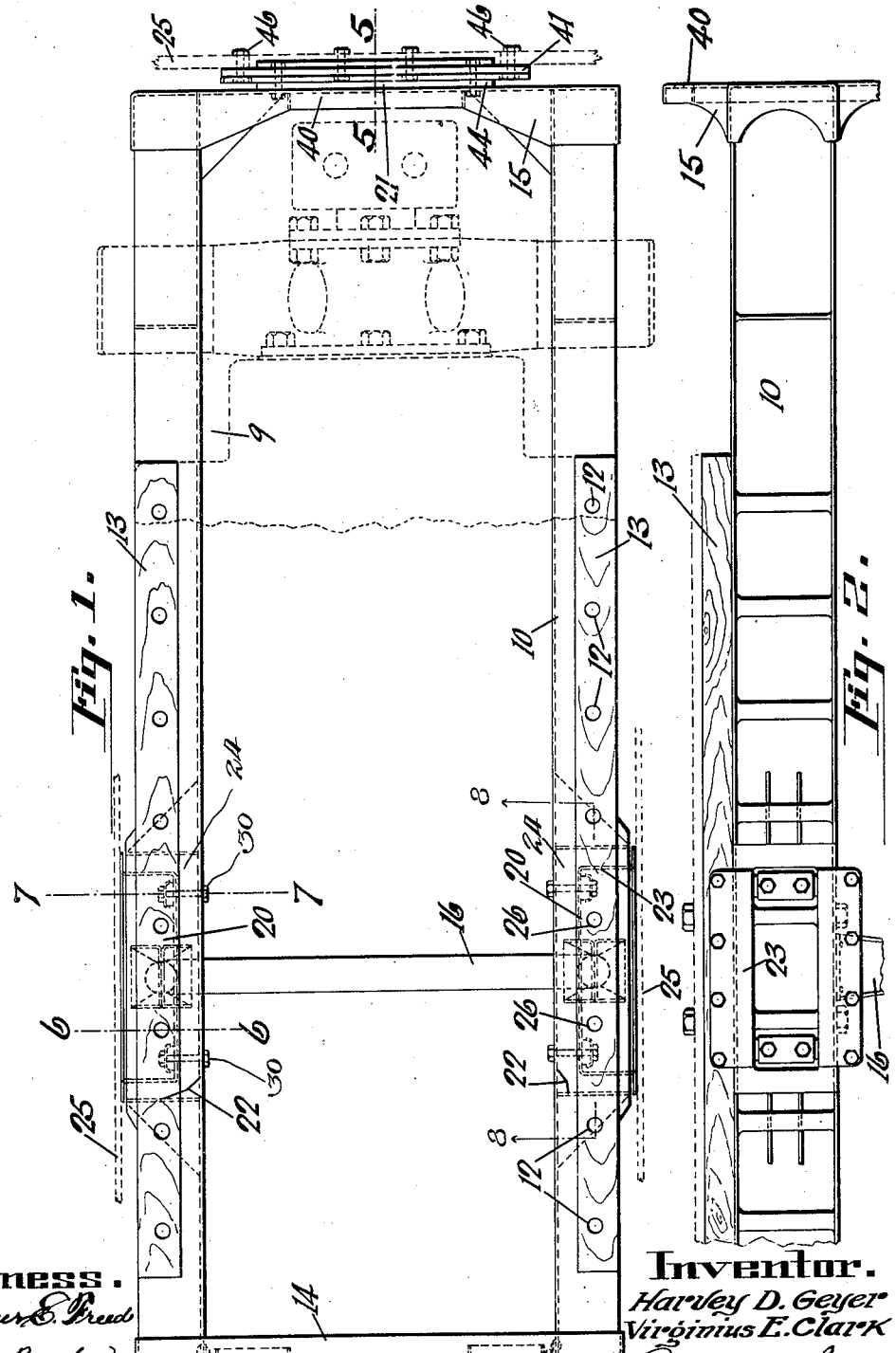

Witnesses.

Inventor.
Harvey D. Geyer
Virginius E. Clark
By Ralph H. Chilton
Attorney.

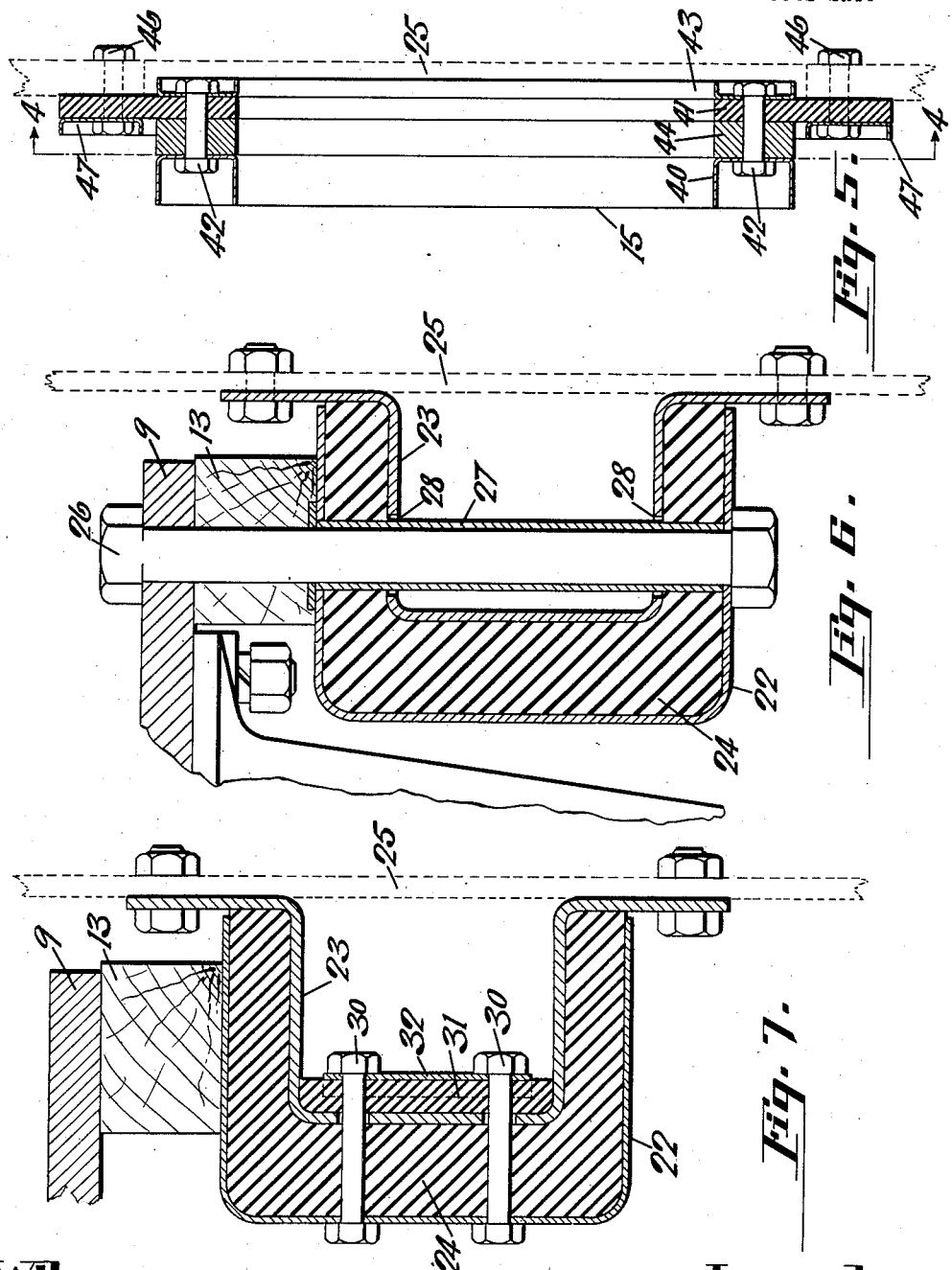

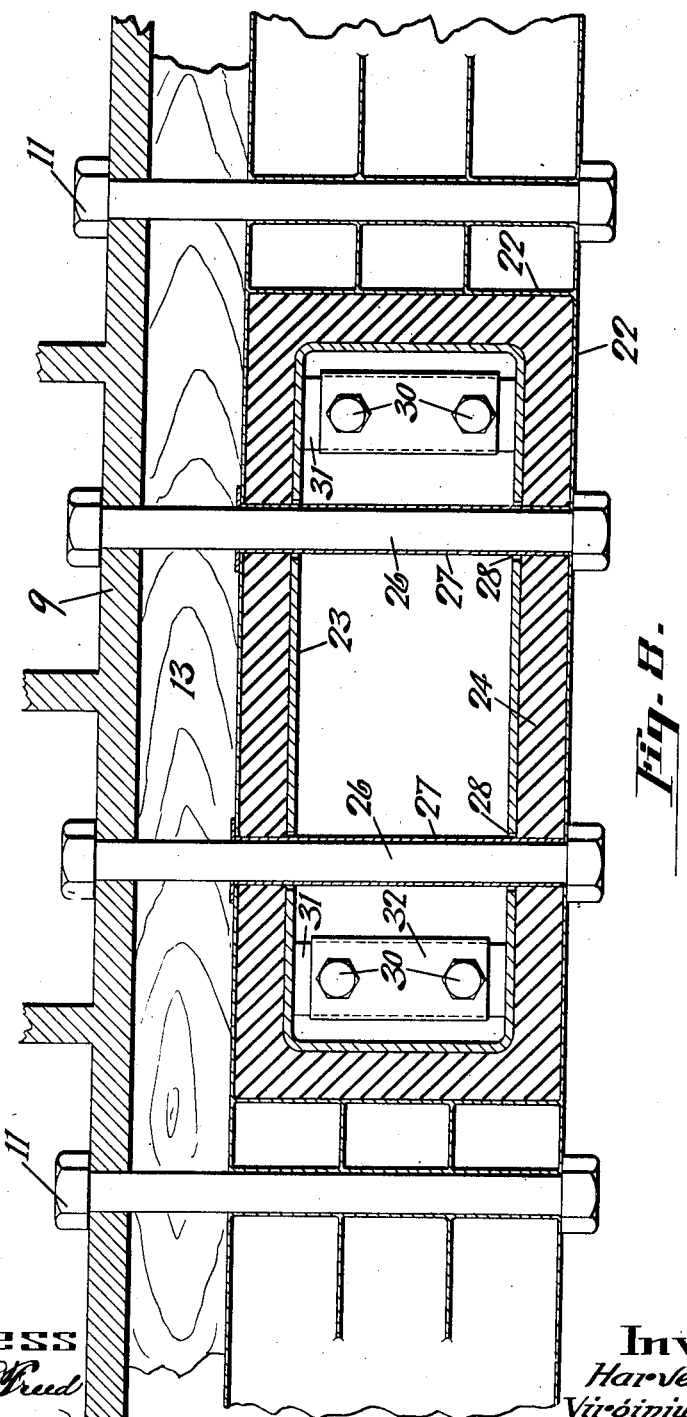

Patented Apr. 3, 1928.

1,664,662

UNITED STATES PATENT OFFICE.

HARVEY D. GEYER AND VIRGINIUS E. CLARK, OF DAYTON, OHIO, ASSIGNORS TO DAYTON-WRIGHT COMPANY, OF DAYTON, OHIO, A CORPORATION OF DELAWARE.

ELASTIC MOTOR MOUNTING FOR VEHICLES.

Application filed December 16, 1921. Serial No. 522,879.

This invention relates to shock absorbing mountings for engines in vehicles, being especially adapted for the engine mountings in aircraft, and has as an object to reduce the amount of vibration transmitted to the vehicle from the engine by means of an elastic mounting.

Another object is to provide elastic supports which give a relatively large bearing area on the elastic material for the amount of elastic material used, and which permit elastic movement of the engine in all directions.

Another object is to provide a ring-shaped elastic support which may extend around a part of the engine or other mechanism and thus not interfere with the same.

Further objects and advantages of the present invention will be apparent from the following description, reference being had to the accompanying drawings, wherein a preferred form of embodiment of the present invention is clearly shown.

In the drawings:

Fig. 1 is a plan view showing the frame to which the engine is rigidly bolted and the three elastic supports for the frame.

Fig. 2 is a side elevation of the frame and showing the stationary part of the side supports in place.

Figure 3:
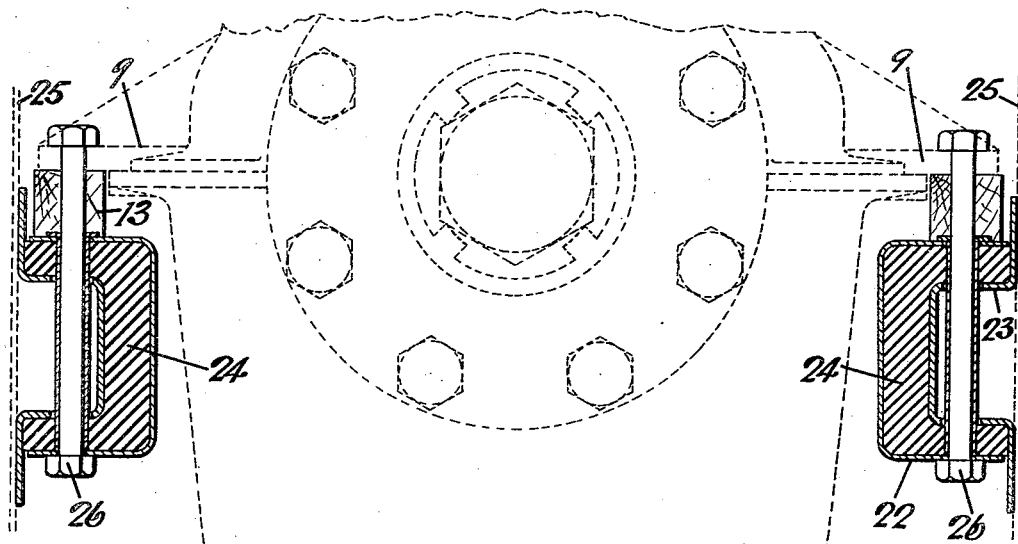
Fig. 3 is a section through the frame on line 6—6 of Fig. 1 and showing the engine in position in dotted lines.
Figure 4:
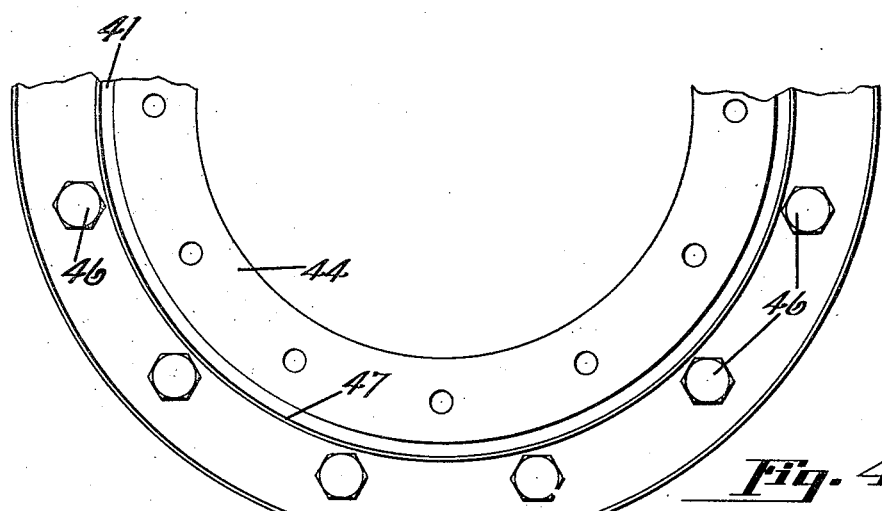
Fig. 4 is a view on line 4—4 of Fig. 5 showing the elastic ring support at the rear of the frame.

Fig. 5 is a section on line 5—5 of Fig. 1.
Fig. 6 is a section on line 6—6 of Fig. 1.
Fig. 7 is a section on line 7—7 of Fig. 1.
Fig. 8 is a section on line 8—8 of Fig. 1 and showing the engine bolted to the frame.

In the drawings similar reference characters refer to similar parts throughout the several views.

Reference numeral 10 refers to the rigid frame to which the engine 9 is firmly attached preferably by means of bolts 11 (see Fig. 8) passing through the holes 12. Instead of bolting the engine directly to the frame 10 we prefer to interpose between the engine 9 and frame 10 the wooden bearers 13 but these bearers are not an essential part of the invention and may be dispensed with if desired. We have shown the frame 10 made up of two channel bars with a front end piece 14 also channel shaped and curving downwardly at the center to avoid interference with engine parts, and a rear end piece 15 which will be later described herein. Also, if desired, there may be a tie brace 16 extending down under the engine and bracing the two side bars at their points of support.

The frame 10 is supported at three points upon the body of the vehicle which is to be driven by the engine, the two side supports 20 being preferably only slightly forward of the center of gravity of the engine with the parts supported thereon, so that these side supports will take nearly all the weight, and the rear support, indicated in its entirety by numeral 21, will take only a small proportion of the engine weight and will act chiefly as a pivot to retain the engine in its proper alignment. The side supports also take the engine thrust and engine torque.

The construction of the side supports 20 will now be described. The side channels of frame 10 have formed therein the chambers 22 (see Figs. 6, 7 and 8) which may be of such length as to give the desired bearing surface on the elastic material later to be described herein. Extending within the chambers 22 as clearly shown in Figs. 6, 7, and 8 are the stationary box shaped supports 23 which are rigidly fastened to the frame 25 of the vehicle to be propelled. These supports 23 are smaller than the chambers 22 in all three dimensions so as to leave the proper space for the elastic material 24 between the supports 23 and the walls of the chamber 22. We do not wish to limit our invention to the use of any particular kind of elastic material as we may use various forms of rubber, rubberized fabric, fiber or any of the special elastic materials now on the market under trade names. We may use rubber having its bearing surfaces toughened by some means such as by having layers of fabric built therein, or we may use an outer layer of tougher rubber with the central part filled with softer or some form of spongy rubber.

Extending through the chamber 22, the elastic material, 24, and the support 23, there may be one or more engine hold down bolts 26 as clearly shown in the drawings. These bolts 26 are preferably enclosed in sleeves 27 as shown, and the holes 28 which allow the bolts to pass through the top and bottom of support 23 are cut sufficiently large to allow the full movement of the bolts due to the engine vibrations without striking support 23.

To assist in compressing the elastic material 24 during assembly and for mounting the same upon the vehicle frame we may use the bolts 30 (see Figs. 7 and 8) for drawing in the support 23 laterally, thus giving an initial compression on the elastic material 24 and decreasing the distance between the flanges of the two supports 23 to enable them to be placed in their position between the members 25 of the vehicle frame. If desired, these bolts 30 may remain in position during operation, in which event elastic material 31 placed in the position shown in Figs. 7 and 8 and held in place by metal plates 32 should be inserted. This elastic material 31 then assists the material 24 in absorbing lateral vibrations.

The construction of the rear central support 21 will now be described. The end bar 15 of the frame 10 is widened out at its center into a large flanged ring 40 (see Figs. 1, 2 and 5). This ring 40 is flexibly attached to the vehicle frame 25 by means of an annular ring 41 composed of elastic material. We have shown in the illustrated form of embodiment of the invention the ring 40 attached to the elastic ring 41 by means of bolts 42, the flanged outer ring 43, and the spacer ring 44. The elastic ring 41 is in turn attached to the vehicle 25 by means of bolts 46 and the flanged ring 47. Preferably the elastic ring 41 is made of layers of heavy fabric impregnated with rubber, but of course it may be made of any other suitable flexible and elastic material. This ring-shaped form of rear engine support permits parts of the engine or associated mechanism to extend therethrough without interference.

While the form of mechanism herein shown and described, constitutes a preferred form of embodiment of the present invention, it is to be understood that other forms might be adopted, all coming within the scope of the claim which follows.

What we claim is as follows:

An elastic shock absorbing support for mounting an engine upon a vehicle, comprising: an outer and an inner box-shaped member internesting with one another, one of said members being rigidly secured to the engine while the other member is rigidly secured to the vehicle, said outer box-shaped member being sufficiently larger than said inner box-shaped member as to leave a space between the corresponding sides of said box-shaped members, and elastic material such as rubber completely filling the space between said members, whereby said elastic support is rendered yieldable in all directions.

In testimony whereof we hereto affix our signatures.

V. E. CLARK.
HARVEY D. GEYER.